Patented Nov. 10, 1953

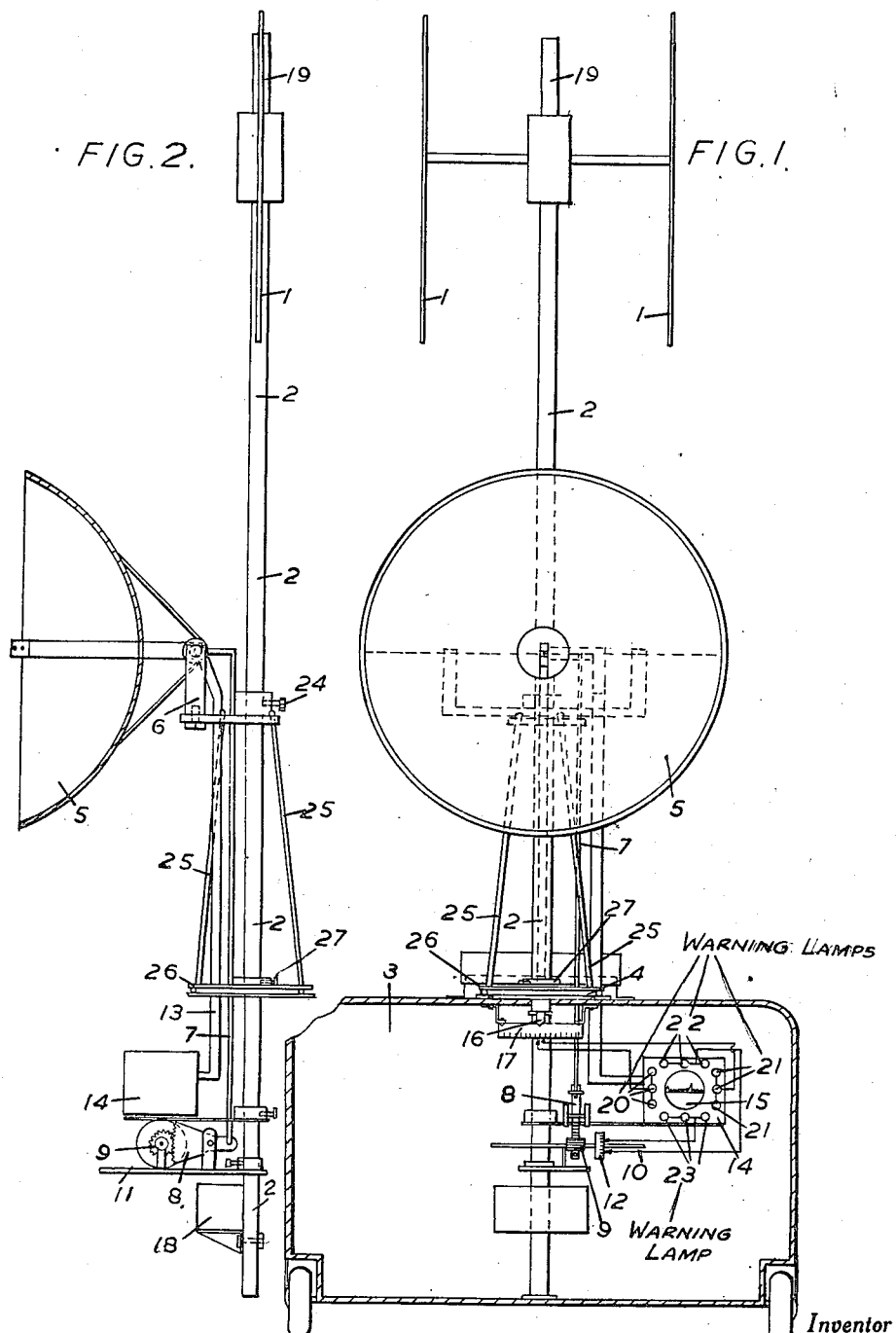

2,659,075

UNITED STATES PATENT OFFICE 2,659,075

RADIO GROUND CONTROL EQUIPMENT FOR AIRCRAFT

Bernard F. Collins, Eastwood, Victor J. Cox, Malmesbury, and Anthony W. Martin, Thundersley, England, assignors to E. K. Cole Limited, Southend-on-Sea, England Application June 6, 1950, Serial No. 166,406

Claims priority, application Great Britain June 15, 1949

5 Claims. (Cl. 343—6)

For complete ground control of an aircraft approach it is necessary to have (a) the range from the runway (b) bearing (c) height. In a comprehensive radar system this information is derived from two aerial systems, one scanning in azimuth and the other in elevation, which present to the operator on his cathode ray tube indicator two plan position indications for bearing and height respectively.

Such a system apears to be necessary when it is desired to control several aircraft simultaneously, but its complexity and cost as well as the number of staff usually required for its operation, put it out of reach of the smaller airports with limited traffic.

The object of the present invention is to provide a simpler and cheaper form of approach and landing aid. Accordingly the invention is not concerned with apparatus in which a radar aerial is continuously rotated in one direction about a vertical axis. In such an apparatus the radar beam searches continuously in all directions picking up whatever may be in its path. On the other hand the present invention uses a radar aerial of a type which is "aimed" or "sighted" by an operator. The term "non-continuously rotated aerial" is used herein to mean an aerial of this latter type.

In the continuously rotated aerial arrangement, the radar beam is narrow only in one plane whereas in the present invention the radar beam is narrow in all planes, including both the azimuth plane and the perpendicular plane. Such a narrow radar-beam may be described as a pencil beam, and this terminology is accordingly used in the appended claims to designate such a narrow beam which may be aimed toward a distant object.

When an aircraft is more than, say, twelve miles from a ground control station the pilot usually requires the operator thereat to give him a bearing only. This is done by ordinary radio communication from information given by the direction finder (D. F.) at the operator's position. It is only when the pilot, nearing the airfield, desires to land that additional information and guidance are required.

For this reason the present invention is most useful, for at a relatively small cost the apparatus enables all the above information to be given, the apparatus comprising a relatively long-range D. F. enabling the bearing to be given and automatically conditioning a short-range radar equipment to be used when the pilot is nearing the airfield.

A feature of the present invention is a ground control apparatus for aircraft comprising a direction finder having a directional aerial adapted to be moved manually about a vertical axis and mechanically coupled to a pencil beam radar aerial of the non-continuously rotated type so that on the bearing of an aircraft having been located by the direction finder the radar aerial will be directed to the azimuth bearing of the aircraft, means for separately moving the radar aerial about a horizontal axis and the radar aerial being coupled to a cathode ray tube, on the viewing screen of which a trace is produced which is adapted to indicate the range of the aircraft from the control apparatus.

The employment of a direction finder (D. F.) of the said type is not an additional expense because such a direction finder is necessary in any case to obtain direction at distances exceeding the range of a radar system of reasonable power.

For convenience the term "radar aerial" is used to include the usual aerial assembly comprising aerial, reflector and dish.

The above and other features of the invention will be made clear in the appended claims and in the following description of one embodiment. In the accompanying drawings, Figure 1 is a front elevation showing diagrammatically a complete apparatus according to the invention and Figure 2 is a sectional side elevation of the parts shown in Figure 1.

The apparatus comprises a D. F. aerial array 1 fixed to a hollow vertical shaft 2 which is supported in the roof of a truck 3 in a bearing 4 which is adapted to rotate in said roof. To the shaft 2 is also fixed a radar aerial 5 which is pivoted on a bracket 6 which is anchored to the shaft 2. The radar aerial 5 may be moved through a vertical angle by actuating a control rod 7 whose lower extremity is connected to one end of a quadrant lever 8, the quadrant end meshing with a spur wheel 9 mounted on a steering rod 10 which is rotatable on its axis in bearings mounted on a bracket 11 anchored to the shaft 2. The steering rod 10 carries a scale 12 which moves over a stationary cursor to give an indication of the cant of the radar aerial according to the different positions of rotation of the steering rod 10. A wave guide 13 has connections to a radar transmitter/receiver 14 which comprises a cathode ray tube 15 upon which a trace (somewhat as indicated) is adapted to be produced by signals received in the radar aerial. The shaft 2 is adapted to be urned about its axis by moving the steering rod 10 in a horizontal plane, the angle of movement being indicated by a cursor 16 and a fixed scale 17. Leads from the D. F. aerial pass through the shaft 2 to the D. F. receiver 18 of ordinary type. 19 is a sense aerial adapted to be connected to one of the aerials 1 for obtaining the sense in the D. F. for direction finding in the normal manner. The cursor 16 is adapted to be set against a reading on the scale 17 according to the angle subtended by the landing strip with respect to the position of the apparatus, and the arrangement is such that, should the shaft 2 be rotated through more than a predetermined angle, say ¾° on either side of the cursor setting, lamps 20 or 21 at the sides of the cathode ray tube would be illuminated to indicate to the operator watching the cathode ray screen that the permissible deflection had been exceeded. Similar lamps 22 and 23 at the top and bottom of the cathode ray tube support respectively are in a circuit controlled by a switch operated by the scale 12 so that if the steering rod 10 be turned about its axis more than say ½° from the predetermined angle of flight, lamps 22 or 23 would be lit. It is thus obvious from the small predetermined angles of permissible deflection that the radar beam may be conveniently described as a pencil beam, being narrow in all directions in a plane at right-angles to the axis of the beam. The bracket 6 is conveniently fixed to the shaft 2 by means of a set screw 24, whilst strength is given to the fixture by means of the legs 25 fixed to a lower bracket 26, secured to the shaft 2 by a set screw 27.

The radar equipment 14 may be of the type well known by those skilled in the art, the only variation being that the frame scanning equipment is omitted. The cathode ray tube screen indication will be in the form somewhat as shown in Figure 1 at 15. The device is provided with what is usually termed a range marker generator which, by closing a switch (usually a pressbutton), causes the trace on the screen to be blanked out over small distances at regular intervals of space. These may alternatively be at say, ½-mile intervals or 2½-mile intervals according to the switch, or may be switched so as to be non-effective. Thus, looking at 15 in Figure 1, the initial peak on the trace would be the transmitted pulse, whilst the second peak would be the result of a received wave caused by the reflection of the transmitted pulse from a distant object. If the marker generator were set for 2½-mile intervals and the first space (counting from the first peak) appeared against the second peak it would indicate that the range of the distance object was 2½ miles from the ground station.

In operation the direction finder is used in the normal manner to locate the direction of an approaching aircraft, of which the pilot would be in radio communication with the operator and the operator could receive by such communication an indication of the height at which the pilot was flying, this would enable the operator to turn the steering rod 10 on its horizontal axis and bring the aircraft indication on to the screen of his cathode ray tube. By intercommunication the operator could inform the pilot of his distance from the equipment and instruct him as to the correct bearing and as to the height he must assume, the operator continually manipulating the steering rod to keep the aircraft indication on the screen of his cathode ray tube. When the aircraft has been brought into the correct line of approach, the operator could without taking his attention from the screen keep the pilot advised of his range and could keep him in the correct line of approach and height. If the pilot left this line by more than a predetermined amount, the operator would be warned by the lighting of the lamps 20, 21 on one side or the other of the screen, whilst if the height varied more than a predetermined amount from that which was indicated by the correct angle of approach, the lamps 22, 23 at the top or bottom of the screen would be illuminated.

The ground equipment would be positioned in line with the run-way to be used, its position being near that end which the pilot would first reach in making a landing. The cursor on the azimuth scale would be set at the bearing representing that subtended by his equipment with regard to the run-way and hence if the D. F. aerials were swung more than ¾° from this position in either direction either one set or the other of the side lamps would light. Similarly, the cursor on the elevation scale would be set at the required vertical angle of approach say 5°, and any canting of the radar aerial more than at say ½° from this angle would be indicated by lamps at the top or bottom of his screen.

While we have described only one embodiment of the invention it is to be understood that we are not limited to the particular details thereof, since various modifications and substitution of equivalents may be made by those skilled in the art, without departing from the invention as defined in the following claims.

We claim:
1. In a ground control appartus for aircraft, a direction finder comprising an aerial of the type which is manually rotatable to the direction of a distant transmitter, a direction-indicating instrument coupled to said aerial, a pencil beam radar aerial of the non-continuously rotated type said radar aerial being coupled to a radar transmitter/receiver having a cathode ray viewing screen, a vertical shaft fixed to said direction-finding aerial and to a bracket having a pivot supporting the radar aerial for vertical movement about said pivot, manually operable means for moving the vertical shaft about its axis and means for moving the radar aerial vertically about said pivot whereby the radar beam may be aimed at a distant object, a first means for indicating the angle in azimuth of both said radar aerial and said direction-finding aerial, and a second indicating means for indicating the vertical angle of said radar aerial.

2. In a ground control apparatus for aircraft, a direction finder comprising an aerial of the type which is manually rotatable to the direction of a distant transmitter, a direction-indicating instrument coupled to said aerial, a pencil beam radar aerial of the non-continuously rotated type, said radar aerial being coupled to a radar transmitter/receiver having a cathode ray viewing screen, a vertical shaft fixed to said direction-finding aerial and to a bracket having a pivot supporting the radar aerial for vertical movement about said pivot, a manually operable steering rod, means operatively connecting said steering rod to said vertical shaft for rotating said vertical shaft about its axis and means operatively connecting said steering rod to said radar aerial for moving said radar aerial vertically about said pivot whereby the radar beam may be aimed at a distant object, a first means for indicating the angle in azimuth of both said radar aerial and direction-finding aerial, a second indicating means for indicating the vertical angle of said radar aerial, means for pre-setting a desired angle on said first indicating means, and means for pre-setting a desired angle on said second indicating means.

3. In a ground control apparatus for aircraft, a direction finder comprising an aerial of the type which is manually rotatable to the direction of a distant transmitter, a direction-indicating instrument coupled to said aerial, a pencil beam radar aerial of the non-continuously rotated type, said radar aerial being coupled to a radar transmitter/receiver having a cathode ray viewing screen, a vertical shaft fixed to said direction-finding aerial and to a bracket having a pivot supporting the radar aerial for vertical movement about said pivot, manually operable means for moving the vertical shaft about its axis and means for moving the radar aerial vertically about said pivot whereby the radar beam may be aimed at a distant object, a first means for indicating the angle in azimuth of both said radar aerial and said direction-finding aerial, a second indicating means for indicating the vertical angle of said radar aerial, a warning device, means to operate said warning device when said vertical shaft is moved more than a predetermined amount beyond the limits of said azimuth angle, and means to operate said warning device when said radar aerial is moved more than a predetermined amount beyond the limits of said vertical angle.

4. In a ground control apparatus for aircraft, a direction finder comprising an aerial of the type which is manually rotatable to the direction of a distant transmitter, a direction-indicating instrument coupled to said aerial, a pencil beam radar aerial of the non-continuously rotated type, said radar aerial being coupled to a radar transmitter/receiver having a cathode ray viewing screen, a vertical shaft fixed to said direction-finding aerial and to a bracket having a pivot supporting the radar aerial for vertical movement about said pivot, a manually operable steering rod, means operatively connecting said steering rod to said vertical shaft for rotating said vertical shaft about its axis and means operatively connecting said steering rod to said radar aerial for moving said radar aerial vertically about said pivot whereby the radar beam may be aimed at a distant object, a first means for indicating the angle in azimuth of both said radar aerial and direction-finding aerial, a second indicating means for indicating the vertical angle of said radar aerial, means for pre-setting a desired angle on said first indicating means, means for pre-setting a desired angle on said second indicating means, a warning device, means to operate said warning device when said vertical shaft is moved more than a predetermined amount beyond the limits of said azimuth angle, and means to operate said warning device when said radar aerial is moved more than a predetermined amount beyond the limits of said vertical angle.

5. In a ground control apparatus for aircraft, a direction finder comprising an aerial of the type which is manually rotatable to the direction of a distant transmitter, a direction-indicating instrument coupled to said aerial, a pencil beam radar aerial of the non-continuously rotated type, said radar aerial being coupled to a radar transmitter/receiver having a cathode ray viewing screen, a vertical shaft fixed to said direction-finding aerial and to a bracket having a pivot supporting the radar aerial for vertical movement about said pivot, a manually operable steering rod, means operatively connecting said steering rod to said vertical shaft for rotating said vertical shaft about its axis and means operatively connecting said steering rod to said radar aerial for moving said radar aerial vertically about said pivot whereby the radar beam may be aimed at a distant object, a first means for indicating the angle in azimuth of both said radar aerial and direction-finding aerial, a second indicating means for indicating the vertical angle of said radar aerial, means for pre-setting a desired angle on said first indicating means, means for pre-setting a desired angle on said second indicating means, lamps located on each side of said viewing screen, means responsive to swinging movement of said steering rod to operate said lamps when said steering rod is swung more than a predetermined amount beyond the limits of said azimuth angle, lamps located above and below said viewing screen, and means responsive to turning movement of said steering rod about its horizontal axis to operate said last-named lamps when the steering rod is turned more than a predetermined amount beyond the limits of said vertical angle.

BERNARD F. COLLINS.
V. J. COX.
A. W. MARTIN.

References Cited in the file of this patent
UNITED STATES PATENTS

| Number | Name | Date |
| --- | --- | --- |
| 2,368,298 | Harris | Jan. 30, 1945 |
| 2,405,231 | Newhouse | Aug. 6, 1946 |
| 2,421,028 | King | May 27, 1947 |
| 2,428,793 | Fay | Oct. 14, 1947 |
| 2,471,264 | Doherty | May 24, 1949 |
| 2,526,314 | Alexanderson et al. | Oct. 17, 1950 |
| 2,585,855 | Sherwin et al. | Feb. 12, 1952 |
| 2,597,895 | Novy | May 27, 1952 |